US012395961B2

(12) United States Patent
Lo et al.

(10) Patent No.: US 12,395,961 B2
(45) Date of Patent: Aug. 19, 2025

(54) SYSTEM AND METHOD FOR APPLYING MACHINE LEARNING TO MOBILE GEOLOCATION

(71) Applicant: NetScout Systems, Inc., Westford, MA (US)

(72) Inventors: Wing F. Lo, Plano, TX (US); Imran Hafeez, Allen, TX (US)

(73) Assignee: NetScout Systems, Inc., Westford, MA (US)

( * ) Notice: Subject to any disclaimer, the term of this patent is extended or adjusted under 35 U.S.C. 154(b) by 511 days.

(21) Appl. No.: 17/902,262

(22) Filed: Sep. 2, 2022

(65) Prior Publication Data

US 2024/0057013 A1 Feb. 15, 2024

Related U.S. Application Data

(60) Provisional application No. 63/398,028, filed on Aug. 15, 2022.

(51) Int. Cl.
*H04L 1/00* (2006.01)
*G06N 20/00* (2019.01)
*H04W 64/00* (2009.01)

(52) U.S. Cl.
CPC ............ *H04W 64/00* (2013.01); *G06N 20/00* (2019.01)

(58) Field of Classification Search
CPC ......... H04W 64/00; G06N 20/00; G06N 3/09; G06N 5/01; G06N 20/20
USPC ...................................................... 455/456.1
See application file for complete search history.

(56) References Cited

U.S. PATENT DOCUMENTS

| 5,945,949 A | * | 8/1999 | Yun | G01S 13/878 455/456.5 |
| 2015/0011239 A1 | * | 1/2015 | Quan | H04W 64/00 455/456.1 |
| 2023/0169366 A1 | * | 6/2023 | Renehan | G06N 3/045 706/12 |

FOREIGN PATENT DOCUMENTS

| CN | 109996168 B | 11/2020 | |
| WO | WO-2021181141 A1 | * 9/2021 | ............ H04W 16/18 |

OTHER PUBLICATIONS

PCT International Search Report and Written Opinion dated Oct. 27, 2023 in International Application No. PCT/US2023/028186.
PCT International Preliminary Report on Patentability dated Feb. 27, 2025 in International Application No. PCT/US2023/028186.

* cited by examiner

*Primary Examiner* — Tanmay K Shah
(74) *Attorney, Agent, or Firm* — Foley & Lardner LLP

(57) ABSTRACT

Disclosed herein is a method to determine a geolocation that includes receiving, by a processor, from a base station (BS), radio predictors, a user equipment (UE) location history, and a geolocation of a first UE for which a minimization of drive test (MDT) mode is activated, radio predictors and a UE location history of a second UE for which the MDT mode is not activated, and cell physical parameters. The method includes training, by the processor, a machine learning (ML) model at least based on the radio predictors, the UE location history, and the geolocation of the first UE, and the cell physical parameters. The method includes executing, by the processor, the ML model to determine the azimuth of the second UE and providing, by the processor, to a downstream application, a geolocation of the second UE at least based on the azimuth and the TA of the second UE.

24 Claims, 6 Drawing Sheets

SYSTEM AND METHOD FOR APPLYING MACHINE LEARNING TO MOBILE GEOLOCATION

CROSS-REFERENCE TO RELATED APPLICATIONS

This application is related to and claims priority under 35 U.S. § 119(e) the U.S. Provisional Patent Application No. 63/398,028, filed Aug. 15, 2022, titled "SYSTEM AND METHOD FOR APPLYING MACHINE LEARNING TO MOBILE GEOLOCATION," the entire contents of which are incorporated herein by reference for all purposes.

BACKGROUND

Cellular Service Providers have started to deploy the Minimization of Drive Test (MDT) feature in the last few years. MDT calls are only 1-3% of the monitored traffic, which is sufficient to leverage machine learning algorithms.

SUMMARY

Systems and methods of this technical solution are directed to using machine learning algorithms to determine geolocation of mobile devices of a cellular network.

At least one aspect is directed to a communication network monitoring device. The communication network monitoring device includes a processor and a memory. The memory includes instructions. The instructions, when executed by the processor, cause the device to receive, from a base station (BS), radio predictors of a first user equipment (UE) for which a minimization of drive test (MDT) mode is activated, a UE location history of the first UE, a geolocation of the first UE, radio predictors of a second UE for which the MDT mode is not activated, a UE location history of the second UE, and cell physical parameters. In some embodiments, the radio predictors of the first UE include a timing advance (TA) of the first UE and a channel quality indication (CQI) of the first UE, and wherein the radio predictors of the second UE include a TA of the second UE and a CQI of the second UE. The instructions, when executed by the processor, cause the device to train a machine learning (ML) model to determine an azimuth of the second UE at least based on the radio predictors of the first UE, the UE location history of the first UE, the geolocation of the first UE, and the cell physical parameters. The instructions, when executed by the processor, cause the device to execute the ML model to determine the azimuth of the second UE and provide, to a downstream application, a geolocation of the second UE at least based on the azimuth of the second UE and the TA of the second UE.

In some embodiments, the ML model that is executed to determine the azimuth of the second UE is trained using the TA of the first UE. In some embodiments, the instructions, when executed by the processor, cause the device to train the ML model using the TA of the first UE before training the ML model to determine the azimuth of the second UE. In some embodiments, the instructions, when executed by the processor, cause the device to execute the ML model that was trained using the TA of the first UE to generate a machine learning timing advance (MLTA) of the first UE. In some embodiments, training the ML model to determine the azimuth of the second UE includes training the ML model using the MLTA of the first UE, and executing the ML model to determine the azimuth of the second UE includes executing the ML model that was trained using the MLTA of the first UE to determine the azimuth of the second UE.

In some embodiments, the instructions, when executed by the processor, cause the device to train a second ML model using the TA of the first UE before training the ML model to determine the azimuth of the second UE, wherein the ML model uses a first algorithm and the second ML model uses a second algorithm different from the first algorithm. In some embodiments, the instructions, when executed by the processor, cause the device to execute the second ML model that was trained using the TA of the first UE to generate a machine learning timing advance (MLTA) of the first UE. In some embodiments, training the ML model to determine the azimuth of the second UE includes training the ML model using the MLTA of the first UE.

In some embodiments, the instructions, when executed by the processor, cause the device to determine an estimated distance between the BS and the second UE at least based on the TA of the second UE. In some embodiments, providing, to the downstream application, the geolocation of the second UE at least based on the azimuth of the second UE and the TA of the second UE includes providing, to the downstream application, the geolocation of the second UE at least based on the azimuth of the second UE and the estimated distance between the BS and the second UE.

In some embodiments, providing, to the downstream application, the geolocation of the second UE at least based on the azimuth of the second UE and the TA of the second UE includes converting the azimuth and an estimated distance between the BS and the second UE at least based on the TA of the second UE into a latitude coordinate and a longitude coordinate and providing the latitude coordinate and the longitude coordinate to the downstream application.

In some embodiments, the ML model uses a plurality of decision trees. In some embodiments, the plurality of decision trees are used in accordance with the Random Forest algorithm. In some embodiments, the radio predictors of the first UE include a measurement report of the first UE, and wherein the radio predictors of the second UE include a measurement report of the second UE.

In some embodiments, the measurement report of the first UE includes a serving cell Reference Signal Received Power (RSRP) of the first UE, a serving cell Reference Signal Received Quality (RSRQ) of the first UE, a neighbor cell RSRP of the first UE, a neighbor cell RSRQ of the first UE, and MDT data, and wherein the measurement report of the second UE includes a serving cell RSRP of the first UE, a serving cell RSRQ of the second UE, a neighbor cell RSRP of the second UE, and a neighbor cell RSRQ of the second UE.

In some embodiments, the measurement report of the first UE includes a serving cell synchronization signal/physical broadcast channel (PBCH) block (SSB) index of the first UE, and a neighbor cell SSB index of the first UE, and wherein the measurement report of the second UE includes a serving cell SSB index of the second UE, and a neighbor cell SSB index of the second UE.

At least one aspect is directed to a method to determine a geolocation. The method includes receiving, by a processor, from a base station (BS), radio predictors of a first user equipment (UE) for which a minimization of drive test (MDT) mode is activated, a UE location history of the first UE, a geolocation of the first UE, radio predictors of a second UE for which the MDT mode is not activated, a UE location history of the second UE, and cell physical parameters. In some embodiments, the radio predictors of the first UE include a timing advance (TA) of the first UE and a channel quality indication (CQI) of the first UE, and wherein the radio predictors of the second UE include a TA of the second UE and a CQI of the second UE. The method includes training, by the processor, a machine learning (ML) model to determine an azimuth of the second UE at least based on the radio predictors of the first UE, the UE location history of the first UE, the geolocation of the first UE, and the cell physical parameters. The method includes executing, by the processor, the ML model to determine the azimuth of the second UE and providing, by the processor, to a downstream application, a geolocation of the second UE at least based on the azimuth of the second UE and the TA of the second UE.

At least one aspect is directed to a non-transitory computer readable medium. The medium includes instructions stored thereon. The instructions, when executed by a processor, cause the processor to receive, from a base station (BS), radio predictors of a first user equipment (UE) for which a minimization of drive test (MDT) mode is activated, a UE location history of the first UE, a geolocation of the first UE, radio predictors of a second UE for which the MDT mode is not activated, a UE location history of the second UE, and cell physical parameters. In some embodiments, the radio predictors of the first UE include a timing advance (TA) of the first UE and a channel quality indication (CQI) of the first UE, and wherein the radio predictors of the second UE include a TA of the second UE and a CQI of the second UE. The instructions, when executed by the processor, cause the processor to train a machine learning (ML) model to determine an azimuth of the second UE at least based on the radio predictors of the first UE, the UE location history of the first UE, the geolocation of the first UE, and the cell physical parameters. The instructions, when executed by the processor, cause the processor to execute the ML model to determine the azimuth of the second UE and provide, to a downstream application, a geolocation of the second UE at least based on the azimuth of the second UE and the TA of the second UE.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
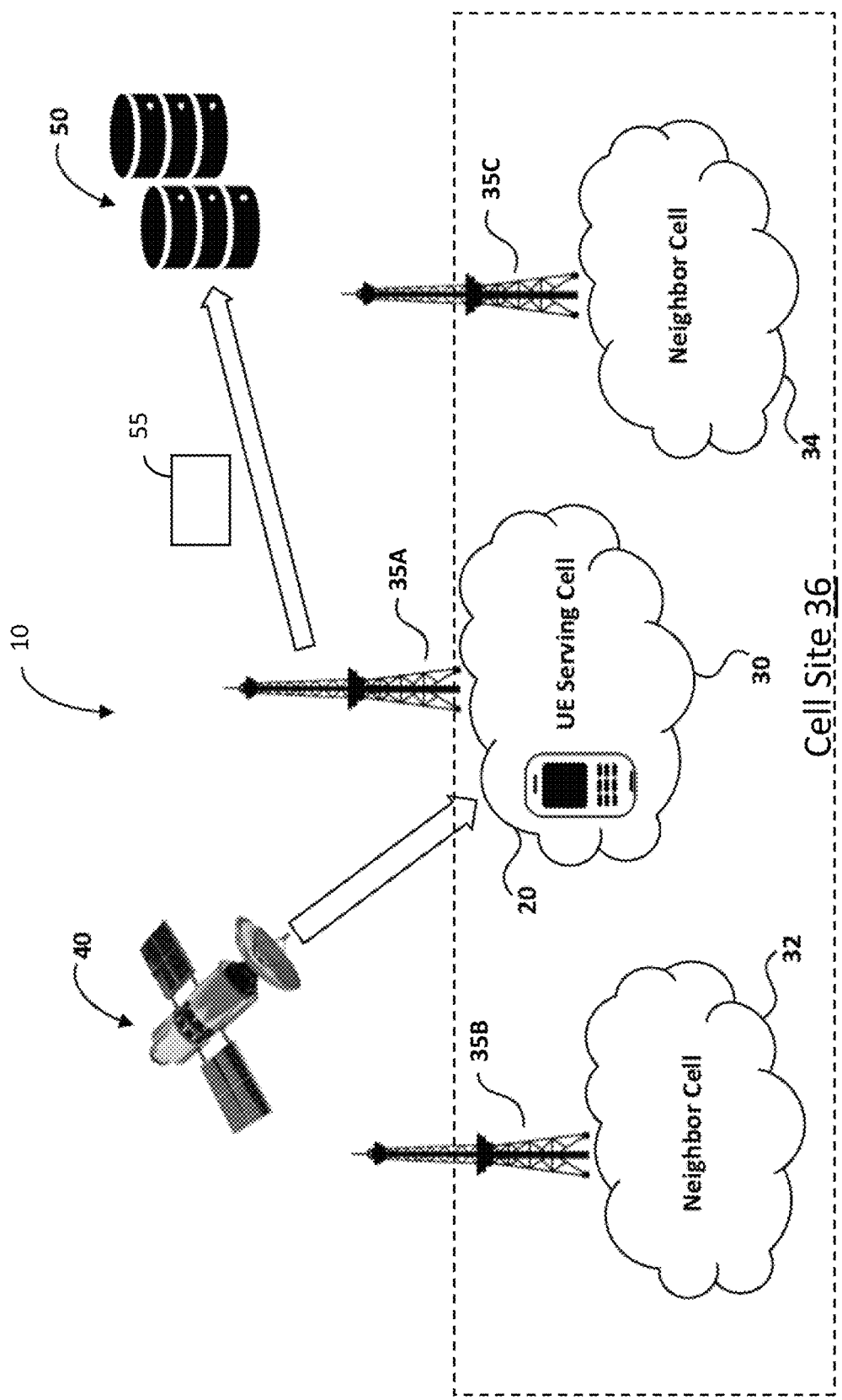
FIG. 1 is a mobile communication system, in accordance with an implementation.

Following below are more detailed descriptions of various concepts related to, and implementations of, methods, apparatus, and systems of correlating packets with synthetic transactions. For example, the methods, apparatus, and systems can provide a captured packet correlator that captures data packets communicated between a client application and a remote service to generate a packet capture file and uses finger-printing data to filter the packet capture file to retain filtered packets associated with synthetic transaction packets. The technical solution can provide the filtered packets to a data processing system to process the filtered packets in real-time in order to evaluate the performance of the services. The technical solution can isolate the data packets corresponding to the synthetic tests from other data packets when the data packets can lack associated metadata that indicates an originating process identifier (PID). The various concepts introduced above and discussed in greater detail below may be implemented in any of numerous ways.

Cellular Service Providers (CSPs) are to determine the geolocation of where each handset (a.k.a., User Equipment (UE)) makes each individual voice and data call (a.k.a., radio resource control (RRC) sessions, UE sessions) in their cellular network. The geolocation data can be used to optimize the operation of the cellular network, like coverage of individual cells and ensuring smooth handover performances other operation performances. In addition, CSPs may anonymize the traffic data and resell the traffic data to third parties for geo-marketing purposes.

CSPs may not have access to UE geolocation information from Global Navigation Satellite Systems (GNSS) such as Global Positioning Systems (GPS) or information of nearby Wi-Fi or Bluetooth networks for geolocation purposes. For geolocation of UE sessions, CSPs may deploy systems that geolocation the cellular system radio signals. Cellular radio signals that may be used are used in geolocation include one or more of timing advance (TA), Reference Signal Received Power (RSRP), of serving cell and neighbor cells, Reference Signal Received Quality (RSRQ) of serving cell and neighbor cells, or recent history of UE locations. The UE may regularly make measurement of the environment and send measurement reports of the radio signal when preconfigured conditions are met. The measurement reports may contain information such as serving cell and neighbor cell RSRP or RSRQ.

Some geolocation systems can operate by combining the serving cell site antenna information (latitude and longitude coordinates of a cell site antenna, antenna characteristics (e.g., a horizontal and vertical beam width, a gain), a mount azimuth, a height above ground with the radio signal predictor information like one or more of RSRP, RSRQ of serving cell and neighbor cells, or a timing advance of serving cells. The serving and neighbor cell site information and radio predictor information can be combined to perform the best estimate of the geolocation of a UE session.

CSPs have started to deploy the Minimization of Drive Test (MDT) feature in the last few years. In MDT, a small fraction of UE calls (a few percent) are activated with the MDT immediate mode feature or other mode that CSPs can use. When MDT immediate mode or other mode is activated and properly configured on a UE, when sending in a Measurement Reports the UE may provide the latitude/longitude geolocation coordinates as well. Under appropriate conditions, optional information such as altitude, velocity, and error estimation can be included in the measurement reports.

The MDT data can provide a source of geolocation data that can be used as training data for a machine learning based geolocation system. Using MDT geolocation as training data, a machine learning system can be developed to predict the latitude and longitude coordinates of any UE RRC Session using the cell information and radio predictors as input to the ML geolocation algorithm.

However, some implementations of ML (e.g., a direct Random Forest implementation) that directly predict the latitude and longitude coordinates have been shown to be very resource intensive. In a large metropolitan market cellular system, there are often thousands of cells. A machine learning model is required for each cell. A large number of (e.g., up to 20 million) RRC Connections may need to be geolocated per hour. To train an ML model, thousands of calls from many different UEs may be needed. A direct ML implementation to predict the latitude and longitude coordinates of every radio resource connection (RRC) may require a significant amount of random access memory (RAM) to store the ML models for each cell and significant central processing unit (CPU) resources to execute the Random Forest algorithm.

Disclosed herein are embodiments of a system and method to transform the geolocation problem space from a rectangular (e.g., latitude and longitude) coordinate system into the cell site view of distance (e.g., range) and azimuth coordinate space. Embodiments of the system and method may be applied to predict the range of a UE session independently of the azimuth. A Random Forest machine learning algorithm may be applied to determine the azimuth of a UE session, which is a one-dimensional variable. The resulting Random Forest tree structure may contain significantly less nodes and tree depth than the original two-dimensional problem required for the same accuracy.

When in polar coordinate, the two-dimensional geolocation problem can be reduced into two one-dimensional problems. The range problem may have a computational very efficient solution (e.g., by using the TA provided by the base station), and the azimuth problem may have a significantly simpler machine learning solution compared to traditional two-dimensional machine learning problems. Some embodiments of a system and method reduce the overall computational complexity of the machine learning geolocation for cellular systems.

Disclosed herein are embodiments of a system and method for a two-stage approach to solving the geolocation problem. In the first stage, "timing advance (TA) correction model" is created, can be adjusted, and is called as Machine Learning Timing Advance (MLTA). The MLTA can be processed in the next stage by the next "Geo prediction model" along with the list of other attributes.

Contrary to the older "fixed/mathematical" methodology, the ML approach may be adaptable to each cell site. In other words, each cell site may have unique radio and cell site attributes which over a period of time changes, like new buildings that are constructed or tree growth, thus creating new radio patterns (e.g., obstructing the radio signals). This can result in changed MDT data. However the models for each cell are also adapted in real time, which was not possible with the older "fixed/mathematical" methodology.

FIG. 1 schematically illustrates a mobile (cellular) communication system 10, in which users of a plurality of mobile communication devices (also referred to herein as user equipments (UEs)) 20 can communicate with other users. The communication system 10 includes a cell site 36. The cell site 36 can be a physical site of a cell tower. As shown in FIG. 1, the cell site 36 includes (e.g., hosts) a number of cells 30, 32, and 34. However, one skilled in the art readily recognizes the communication includes any number of suitable cells. In some embodiments, each of the cells 30-34 can be a different frequency or azimuth in the cell site 36. In a first example, the cell 30 faces north with azimuth of 0 degrees (from north), the cell 32 faces southeast with an azimuth of 120 degrees (from north), and the cell 34 faces southwest with an azimuth of 240 degrees (from north). This can be referred to as a 3-sector site. In a second example, the cell 30 has 12 cells, or four 3-sector sites, each operating at a different radio frequency.

A base station is equipment supporting (e.g., serving) a cell site (e.g., a cell of the cell site). For example, in FIG. 1, a base station 35A supports the cell 30, a base station 35B supports the cell 32, and a base station 35C supports the cell 34. In some embodiments, more than one base station can support a cell. In some embodiments, a base station can support more than one cell or cell site. Each cell can include an antenna. Each base station can include an antenna.

The UE 20 can communicate to other users via a suitable cellular radio access network (RAN) and a respective core network (CN). In the case of 3G, the cellular RAN is a Universal Mobile Telecommunications Service (UMTS) RAN (UTRAN) and the CN is a UMTS CN. In the case of 4G, the cellular RAN is a Long-Term Evolution (LTE) RAN (E-UTRAN) and the CN is an Evolved Packet Core (EPC). In the case of 5G, the cellular RAN is a Next Generation (NG) RAN (NG-RAN) and the CN is a 5G CN (5GC). In some embodiments, the RAN is a cloud-based RAN such as a centralized RAN (CRAN) or Open RAN (ORAN).

As one skilled in the art would readily recognize, the communication system 10 includes one or more RANs. A RAN covers one or more cell sites such as the cell site 36. In some embodiments, a RAN includes a plurality of smaller RANs with interconnect. For example, a non-standalone (NSA) NG-RAN includes an NG-RAN and an E-UTRAN.

Each RAN includes one or more base stations. The type of base station depends on the type of RAN. For instance, a base station of a UTRAN includes a 'NodeB,' a base station of an E-UTRAN includes an 'evolved NodeB' (eNB), and a base station of an NG-RAN includes a 'Next Generation NodeB' (gNB). The UTRAN base station further includes typically a Radio Network Controller (RNC). The radio network control functionality of the E-UTRAN and the NG-RAN is integrated typically with the base station functionality in the eNB and the gNB, respectively.

In an embodiments of a UTRAN, each of the base stations 35A-35C are NodeBs. In some embodiments of a E-UTRAN, each of the base stations 35A-35C are eNodeBs. In some embodiments of an NG-RAN, each of the base stations 35A-35C are gNodeBs. In some embodiments of an NG-RAN, the base stations 35A-35C are some combination of two or more of NodeBs, eNodeBs, and gNodeBs. In some embodiments of a cloud-based RAN, a base station can serve multiple cell sites.

A UE engaged in a call is served by a cell. As shown in FIG. 1, the cell 30 is the serving cell that serves the UE 20. A neighbor cell can be another cell on the same cell site as the serving cell. As shown in FIG. 1, the cells 32 and 34 are the neighbor cells with reference to the UE 20 and the cell 30. The neighbor cells are not limited to the cells in a same cell site as the serving cell.

It is to be appreciated that the UE devices 20 of the communication system 10 can employ Minimization of Drive Test (MDT) procedures for minimizing drive test requirements in which selected UEs 20 (typically 1-3% of all UEs in the communication system 10) acquire appropriate Global Positioning System (GPS) location measurements and data from a GPS system 40 and report them to the system 10 with, where appropriate, associated location information (e.g., GPS data).

In accordance with the preferred embodiments, communicatively coupled to the cellular communication system 10 is a communication network monitoring device 50, such as the TrueCall® system commercially available from NetScout. The network monitoring device 50 may be operable and configured to monitor incoming signaling call records from UEs 20 in the communication system 10 to provide enriched and actionable RAN data which may be utilized to diagnose network and UE problems in real-time, understand demand density and usage, support traffic pattern analysis for network capacity planning, geolocate dropped calls, minimize drive testing and gain an end-to-end view from the radio network to the IP Multimedia Subsystem (IMS) core. In particular, the network monitoring device 50 can provide real-time analysis of data originating in the RAN(s) (e.g., the RAN(s) of cell site 36). The data may be enriched using the geolocation algorithm of the network monitoring device 50 and correlated with subscriber and device data enabling insight into the performance of the RANs by combining dimensions of a RAN operation in a single location, as further discussed herein. Exemplary features and functionality of the network monitoring device 50 include but are not limited to: diagnose network and device 20 problems in real-time; identify demand density and drill down to map usage; study traffic patterns; and geolocate calls and minimize drive testing as discussed herein with reference to the described illustrated embodiments.

It is to be appreciated that incoming signaling record 55 of a number of UEs such as the UE 20 is received and monitored by the network monitoring device 50. Such an incoming signaling record 55 may include one or more of radio predictors (a.k.a., radio signal attributes) of the UE 20, UE location history of the UE 20, or cell physical parameters for each cell of one or more cells (e.g., the cell 30, the cell 32, and/or the cell 34). The radio predictors can include physical layer (a.k.a., layer 1) information such as one or more of Timing Advance (TA) signal of the UE 20 or a channel quality indication (CQI) of the UE 20. The cell physical parameters may include one or more of antenna azimuth, latitude/longitude location, mounting height, an antenna horizontal and vertical beam width, an antenna boresight direction, and an antenna gain or signal transmit power.

The radio predictors can include radio resource control (RRC) layer (a.k.a., layer 3) information embodied in a measurement report. The measurement report may include one or more of a signal strength value of a serving cell for the UE 20 (e.g., a Reference Signal Received Power (RSRP) signal value); a signal quality value of a serving cell for the UE 20 (e.g., a Reference Signal Received Quality (RSRQ) signal value); a signal strength value of a neighboring cell relative to the serving cell for the UE 20; a signal quality value of a neighboring cell relative to the serving cell for the UE 20. In the case of 5G, the measurement report may include a serving cell synchronization signal/physical broadcast channel (PBCH) block (SSB) index of the UE 20, and a neighbor cell SSB index of the UE 20. In the case that Minimization of Drive Test (MDT) mode is activated for the UE 20, the measurement may include a data record of the UE 20.

The incoming signaling record 55 can include different types of information for different UEs. For example, the incoming signaling record 55 can include TA, CQI, and UE location history for a first UE, TA, CQI, UE location history, and a non-MDT measurement report for a second UE, and a TA, CQI, UE location history, and an MDT measurement report for a third UE.

The network monitoring device 50 can store the incoming signaling record 55 in various ways. For example, the physical parameters of each cell of the incoming signaling record 55 can be stored into a data structure (e.g., a matrix, a table, a network element table). The data structure can include a plurality of structures of a first dimension (e.g., rows) and a plurality of structures of a second dimension (e.g., columns). Each cell can be associated with a structure in the first dimension and a physical parameter of the incoming signaling record 55 can be associated with a structure in the second dimension. For example, each row can be assigned to one cell, and each column can be assigned to one of the physical parameters. Thus, a first parameter of a first cell can be stored in the data structure in a location corresponding to the row assigned to the first cell and the column assigned to the first physical parameter.

It is to be understood the TA signal value in a cellular communication system 10 corresponds to the length of time a signal takes to reach a base station 35 from a communicating UE mobile phone 20. For instance, a Global System for Mobile (GSM) uses Time-division multiple access (TDMA) technology in the radio interface to share a single frequency between several users, assigning sequential timeslots to the individual users sharing a frequency. Each user transmits periodically for less than one-eighth of the time within one of the eight timeslots. Since the users are at various distances from the base station and radio waves travel at the finite speed of light, the precise arrival-time within the slot can be used by the base station to determine the distance to the mobile phone. The time at which the phone is allowed to transmit a burst of traffic within a timeslot may be adjusted accordingly to prevent collisions with adjacent users. Timing Advance (TA) is the variable controlling this adjustment. It is to be appreciated that Timing Advance is significant for privacy and communications security, as its combination with other variables can allow the mobile communication system 10 to find the device's position and track the mobile phone user. TA may also be used to adjust transmission power in space-division multiple access systems.

Figure 2:
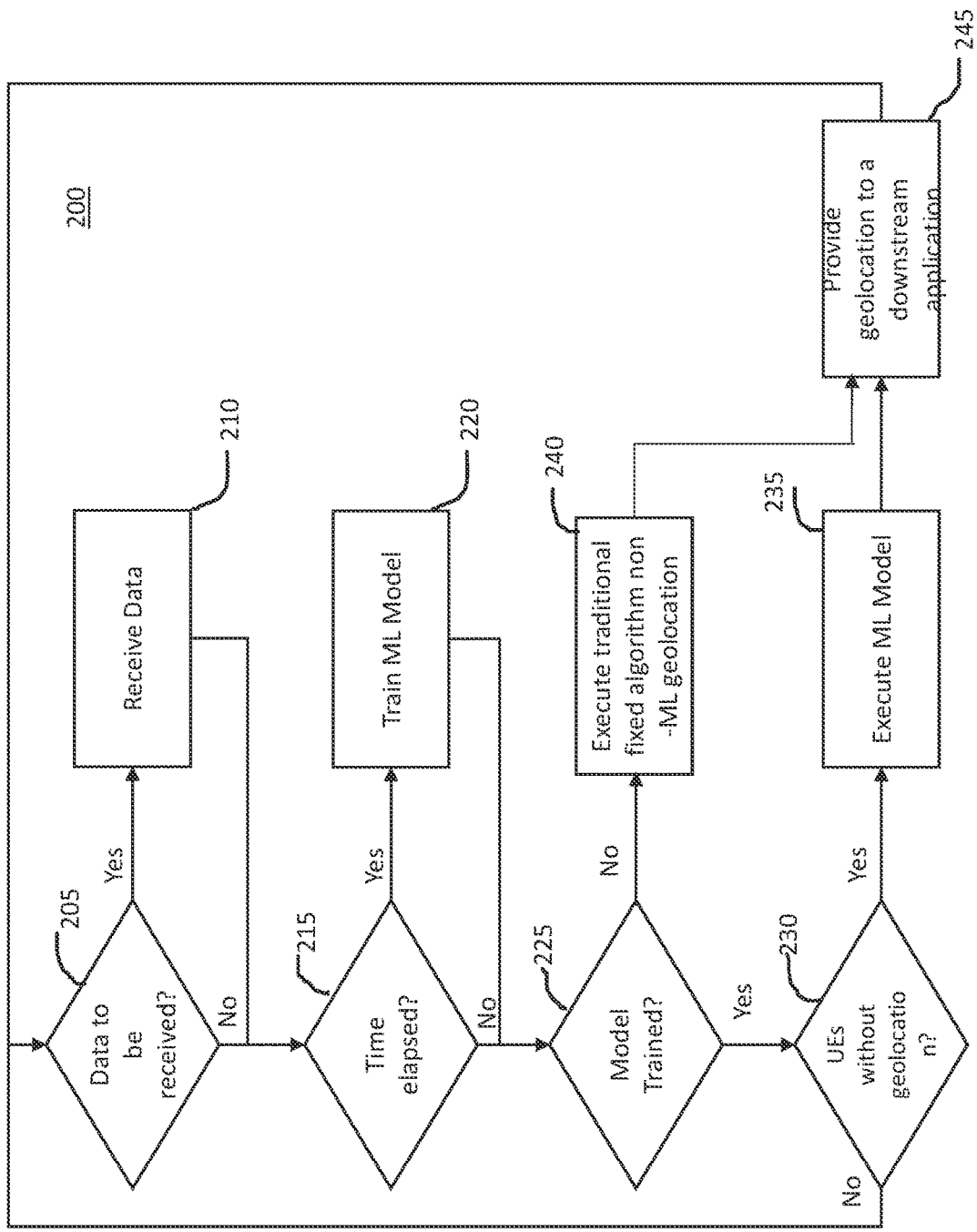
FIG. 2 is an illustration of a method of processing the incoming signaling record to determine a geolocation in accordance with an implementation.

FIG. 2 is an illustration of a method 200 of receiving and processing a signaling record (e.g., the incoming signaling record 55) to determine a geolocation of a UE (e.g., the UE 20) in accordance with an implementation. The method 200 can be performed by one or more system, component or module depicted in FIG. 1 or FIG. 6, including, for example, a communication network monitoring device (e.g., communication network monitoring device 50), or one or more processors of any of the above. Additional, fewer, or different operations may be performed in the method 200 depending on the embodiment. Additionally, or alternatively, two or more of the blocks of the method 200 may be performed in parallel.

In some embodiments, at operation 205, the communication network monitoring device determines whether there is a signaling record to be received. In some embodiments, in response to determining that there is a signaling record to be received, the communication network monitoring device proceeds to operation 210, and in response to determining that there is not a signaling record to be received, the communication network monitoring device proceeds to operation 215.

At operation 210, the communication network monitoring device receives the signaling record. The communication network monitoring device can receive the signaling record from a base station (e.g., the base station 35). As described above, the signaling record can include UE data and cell data corresponding to a number of UEs that are in a call (e.g., for which an RRC session has been established). That is, data from a number of UEs can be batched into a signaling record that is sent to the communication network monitoring device. In some embodiments, the signaling record is stored in a storage or memory of the communication network monitoring device.

In some embodiments, at operation 215, the communication network monitoring device determines if a predetermined time has elapsed. The predetermined time is set to periodically allow training of a machine learning (ML) model in the communication network monitoring device. In some embodiments, in response to determining that the predetermined time has elapsed, the communication network monitoring device proceeds to operation 220, and in response to determining that the predetermined time has not elapsed, the communication network monitoring device proceeds to operation 225.

At operation 220, the communication network monitoring device trains the ML model using a number of signaling records received by the communication network monitoring device. In some embodiments, the communication network monitoring device uses UE and cell data corresponding to UEs that include have GPS data or other geolocation data in order to train the ML model. In some embodiments, the communication network monitoring device uses UE and cell data corresponding to UEs that include have MDT mode activated in order to train the ML model. For example, data corresponding to a UE with MDT mode activated may include radio predictors, UE location history, and cell physical parameters. The radio predictors may include MDT data indicating the geolocation of the corresponding UE with MDT mode activated. In regards to training the ML model, in some embodiments, the communication network monitoring uses UE and cell data corresponding to UEs that do not have geolocation data (e.g., GPS data, MDT mode activated, etc.) to train the ML model, whereas, in some embodiments, the communication network monitoring ignores or otherwise does not use UE and cell data corresponding to UEs that do not have geolocation data (e.g., GPS data, MDT mode activated, etc.).

In some embodiments, the communication network monitoring device checks for validity of the GPS data or other geolocation data of the (e.g., MDT-activated) UE before using it for ML model training. For example, a UE many report MDT data (e.g., GPS location data) that disagrees above a threshold with some or all the other radio predictors. In these cases, the communication network monitoring device may not use the MDT data of that UE for ML model training. In some embodiments, checking for validity includes ensuring the GPS latitude and longitude fields are present with valid ranges (e.g., have not been corrupted); ensuring the MDT accuracy fields are present with an accuracy according to a threshold range (e.g., 1 to 100 meters); and/or ensuring the MDT speed field is present, and preferably with a positive range.

At operation 225, the communication network monitoring device determines whether the model is trained. In some embodiments, in response to determining that the model is trained, the communication network monitoring device proceeds to operation 230, and in response to determining that the ML model is not trained, the communication network monitoring device proceeds to operation 240.

At operation 230, the communication network monitoring device determines whether the signaling record includes data and cell data corresponding to UEs for which a geolocation is unknown (e.g., UEs for which MDT mode is not activated and no GPS data or other geolocation is available, such as a second instance of the UE 20). In some embodiments, in response to determining that the signaling record includes data and cell data corresponding to UEs for which a geolocation is unknown, the communication network monitoring device proceeds to operation 235, and in response to determining that the signaling record does not include data and cell data corresponding to UEs for which a geolocation is unknown, the communication network monitoring device returns to operation 205.

At operation 235, the communication network monitoring device executes the ML model on the UEs for which a geolocation is unknown in order to determine the geolocation. The ML model can use one or more of the radio parameters, UE location history, or the cell physical parameters associated with a UE for which a geolocation is unknown as inputs to the ML model. In some embodiments, the ML model determines an azimuth for the UE for which a geolocation is unknown as inputs to the ML model and leverages a TA that is included as part of the radio predictors for that UE. In some embodiments, the ML model uses the inputs to adjust the TA to a machine learning timing advance (MLTA), trains the ML model (or a second ML model) with the MLTA, and executes the ML model (or the second ML model) to determine the azimuth for the UE for which a geolocation is unknown as inputs to the ML model. In some embodiments, the ML model uses the inputs to adjust a TA-derived distance to a machine learning an MLTA-derived distance.

At operation 240, the communication network monitoring device executes a traditional fixed algorithm on the UEs for which a geolocation is unknown in order to determine the geolocation without use of a ML model. In response to completing operation 235 or 240, the communication network monitoring device proceeds to operation 245.

At operation 245, the communication network monitoring device provides the geolocation to a downstream application. The downstream application can be an application of a cellular service provider (CSP) or a third-party application. The geolocation data can be used to optimize the operation of the cellular network or for geo-marketing purposes. In some embodiments, the communication network monitoring device converts the azimuth and a timing advance distance to a latitude and longitude and provides the latitude and longitude to the downstream application. In some embodiments, the communication network monitoring device provides the azimuth and the timing advance distance to the downstream application.

The timing advance distance is understood to be the distance between a base station and the UE for which a geolocation is unknown as inputs to the ML model. As discussed above, the timing advance distance can be determined using the TA (or the MLTA) and the speed of light.

For example, the timing advance distance can be calculated as half of a product of the speed of light and the TA (or the MLTA). The factor of 2 can account for the round trip. In some embodiments, the timing advance distance can be received as part of the measurement report.

The communication network monitoring device 50 can determine a geolocation of a number of UEs using a machine learning (ML) geolocation algorithm. The ML algorithm can include a neural network such as tensor flow. The neural network is more accurate but at the expense of being slower to execute and more central processing unit (CPU) intensive. An appropriate use-case for neural networks may be image recognition. The ML algorithm can include a regression algorithm, such as a tree-based model, linear regression, or multi-regression. Linear and multi-regression are more appropriate for where a coefficient may be determined but less appropriate for deciphering complex trends. A tree-based model such as the random forest algorithm may be used to determine a geolocation of a number of UEs. The random forest algorithm is less CPU intensive, moderate for random access memory (RAM) utilization, and quicker in executing than a neural network model. The Random Forest can be used for highly intensive processing, real-time applications.

The geolocation problem can be broken down into two one-dimensional problems—solving for the distance of a UE and solving for the azimuth of UE. The complexity (number of nodes and number of layers) of the decision trees in the Random Forest required to determine the one-dimensional azimuth is significantly less than apply Random Forest directly to determination of latitude longitude coordinates. The random forest for azimuth execution can require much less CPU and memory (tree size) resources.

In some embodiments, the communication network monitoring device 50 uses the distance in the signaling record 55 or uses the TA in the signaling record to calculate the distance, and the communication network monitoring device 50 uses the Random Forest algorithm can be used to determine the azimuth of one or more UEs, although other ML algorithms are within the scope of the present disclosure. In some embodiments, the communication network monitoring device 50 uses the Random Forest algorithm separately to determine the MLTA. Using a same type of ML model for both variables may simplify implementation of the communication network monitoring device 50. In some embodiments, the communication network monitoring device 50 uses linear regression or multi-regression to determine the MLTA. Using a simpler ML model for the distance may reduce CPU utilization, RAM utilization and latency of the communication network monitoring device 50.

Figure 3:
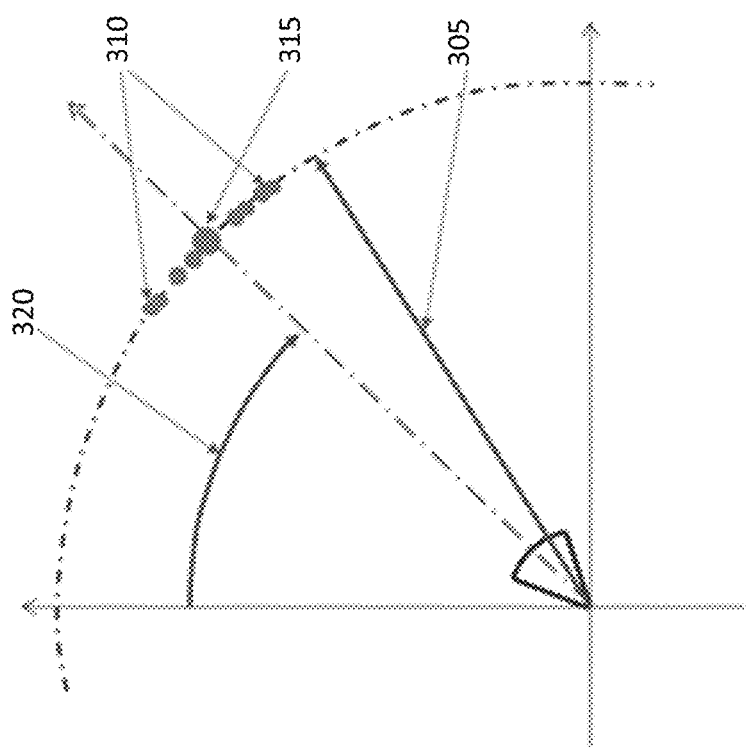
FIG. 3 is an illustration of a diagram of determining an azimuth using a Random Forest machine learning algorithm, in accordance with an implementation.

FIG. 3 is an illustration of a diagram 300 of determining an azimuth using a Random Forest algorithm, in accordance with an implementation. The diagram 300 includes a UE-to-cell site distance 305. In some embodiments, the UE-to-Cell site distance is set to the TA distance. In some embodiments, the UE-to-Cell site distance is set to the MLTA distance. The diagram 300 includes predicted azimuths 310 of the individual trees in a Random Forest Algorithm. The diagram 300 includes a predicted azimuth 315, which can be represented as a mean azimuth of all predicted azimuths 310. The azimuth can be understood as an angle from the North 320.

Figure 4:
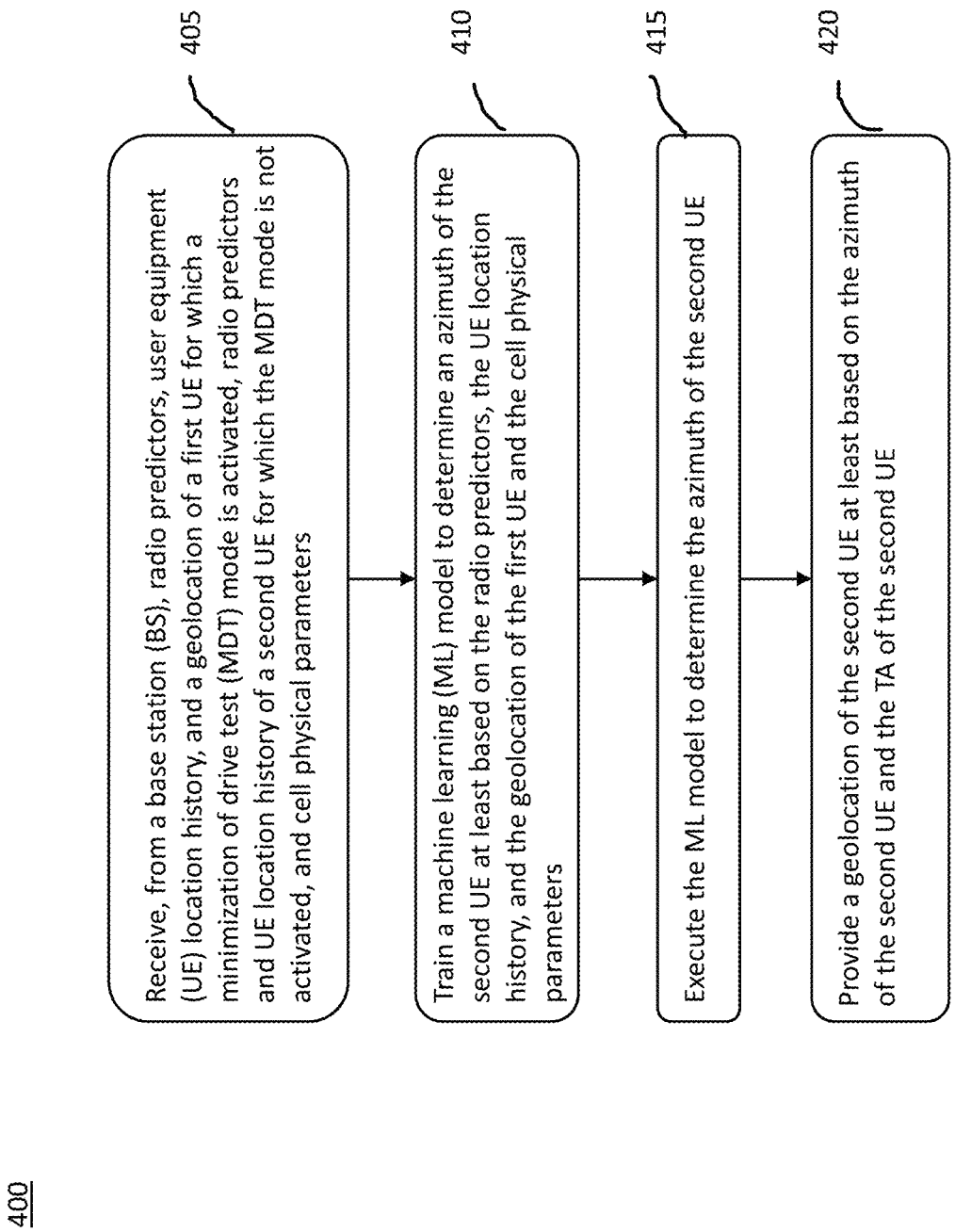
FIG. 4 is an illustration of a method of receiving and processing UE and cell data to determine a geolocation of a UE in accordance with an implementation.

FIG. 4 is an illustration of a method 400 of receiving and processing UE and cell data to determine a geolocation of a UE in accordance with an implementation. The method 400 can be performed by one or more system, component or module depicted in FIG. 1, including, for example, a communication network monitoring device (e.g., communication network monitoring device 50), or one or more processors of any of the above. The method 400 can be performed using a one-stage or a two-stage approach. Additional, fewer, or different operations may be performed in the method 400 depending on the embodiment. Additionally, or alternatively, two or more of the blocks of the method 400 may be performed in parallel. Operations of the method 400 can be combined with or interchanged with operations of the method 200.

At operation 405, the communication network monitoring device receives, from a base station (BS), radio predictors, user equipment (UE) location history, and a geolocation (e.g., GPS data) of a first UE (e.g., for which a minimization of drive test (MDT) mode is activated or GPS data or other geolocation data is otherwise available), radio predictors and UE location history of a second UE (e.g., for which the MDT mode is not activated and/or GPS data or other geolocation data is not available), and cell physical parameters. In some embodiments, the radio predictors of the first UE include a timing advance (TA) of the first UE and a channel quality indication (CQI) of the first UE and the radio predictors of the second UE include a TA of the second UE and a CQI of the second UE.

In some embodiments, the radio predictors of the first UE include a measurement report of the first UE, and wherein the radio predictors of the second UE include a measurement report of the second UE. In some embodiments, the measurement report of the first UE includes a serving cell RSRP of the first UE, a serving cell RSRQ of the first UE, a neighbor cell RSRP of the first UE, a neighbor cell RSRQ of the first UE, and MDT data. In some embodiments, the measurement report of the second UE includes a serving cell RSRP of the first UE, a serving cell RSRQ of the second UE, a neighbor cell RSRP of the second UE, and a neighbor cell RSRQ of the second UE. In some embodiments, the measurement report of the first UE includes a serving cell SSB index of the first UE, and a neighbor cell SSB index of the first UE. In some embodiments, the measurement report of the second UE includes a serving cell SSB index of the second UE, and a neighbor cell SSB index of the second UE. In some embodiments, the cell physical parameters include antenna latitude/longitude location of a base station, antenna horizontal and vertical beam width of a base station, antenna boresight direction of a base station, antenna gain of a base station, and signal transmit power of a base station.

At operation 410, the communication network monitoring device trains a machine learning (ML) model to determine an azimuth of the second UE at least based on the radio predictors, the UE location history, and the geolocation of the first UE and the cell physical parameters. In some embodiments, training the ML model to determine the azimuth of the second UE includes training the ML model using the TA of the first UE.

In some embodiments, the communication network monitoring device trains the ML model using the TA of first UE before training the ML model to determine the azimuth of the second UE. In some embodiments, the communication network monitoring device executes the ML model that was trained using the TA of first UE to generate a machine learning timing advance (MLTA) of the first UE. In some embodiments, training the ML model to determine the azimuth of the second UE includes training the ML model using the MLTA of the first UE. In some embodiments, the communication network monitoring device executes the ML model that was trained using the TA of first UE to generate an MLTA of the second UE. In some embodiments, the actual physical model file for the first UE is used to obtain the MLTA for the second UE.

In some embodiments, the ML model uses a plurality of decision trees. In some embodiments, the plurality of decision trees are used in accordance with the Random Forest algorithm. In some embodiments, the ML model uses a neural network.

At operation 415, the communication network monitoring device executes the ML model to determine the azimuth of the second UE. In some embodiments, the ML model that is executed to determine the azimuth of the second UE is trained using the TA of the first UE. In some embodiments, executing the ML model to determine the azimuth of the second UE includes executing the ML model that was trained using the MLTA of the first UE to determine the azimuth of the second UE.

At operation 420, the communication network monitoring device provides, to a downstream application, a geolocation of the second UE at least based on the azimuth of the second UE and one of the TA of the second UE or the MLTA of the second UE. In some embodiments, the communication network monitoring device determines an estimated distance between the BS and the second UE at least based on the TA (or the MLTA) of the second UE. In some embodiments, providing, to the downstream application, the geolocation of the second UE at least based on the azimuth of the second UE and the TA (or the MLTA) of the second UE includes providing, to the downstream application, the geolocation of the second UE at least based on the azimuth of the second UE and the estimated distance between the BS and the second UE. In some embodiments, providing, to the downstream application, the geolocation of the second UE at least based on the azimuth of the second UE and the TA (or the MLTA) of the second UE includes converting the azimuth and the estimated distance between the BS and the second UE at least based on the TA (or the MLTA) of the second UE into a latitude coordinate and a longitude coordinate, and providing the latitude coordinate and the longitude coordinate to the downstream application.

Figure 5:
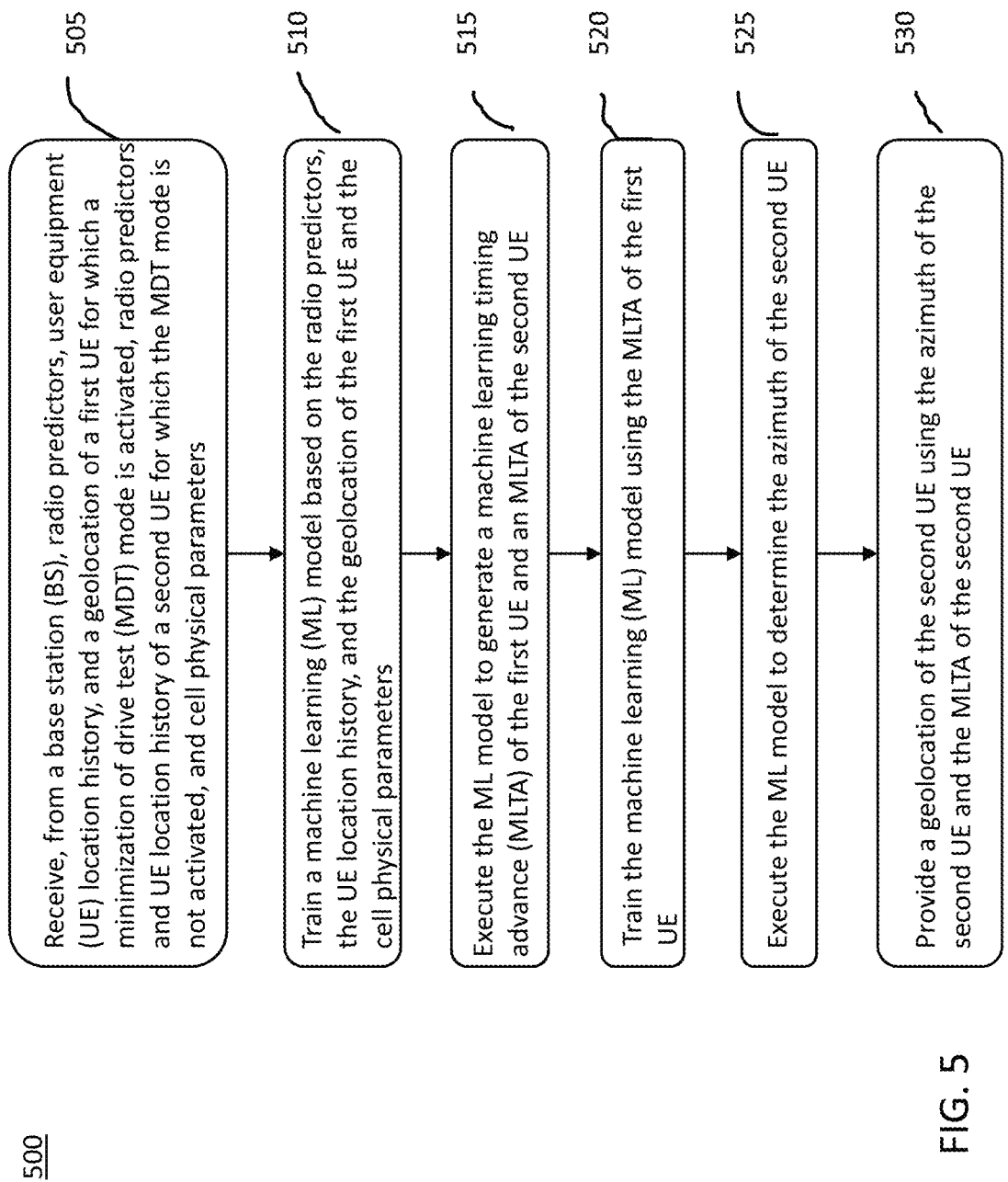
FIG. 5 is an illustration of a method of using a two-stage approach to determine a geolocation of a UE in accordance with an implementation.

FIG. 5 is an illustration of a method of using a two-stage approach to determine a geolocation of a UE in accordance with an implementation. The method 500 can be performed by one or more system, component or module depicted in FIG. 1, including, for example, a communication network monitoring device (e.g., communication network monitoring device 50), or one or more processors of any of the above. Additional, fewer, or different operations may be performed in the method 500 depending on the embodiment. Additionally, or alternatively, two or more of the blocks of the method 500 may be performed in parallel. Operations of the method 500 can be combined with or interchanged with operations of the method 200 or the method 400.

At operation 505, the communication network monitoring device receives, from a base station (BS), radio predictors, user equipment (UE) location history, and a geolocation (e.g., GPS data) of a first UE (e.g., for which a minimization of drive test (MDT) mode is activated or GPS data or other geolocation data is otherwise available), radio predictors and UE location history of a second UE (e.g., for which the MDT mode is not activated and/or GPS data or other geolocation data is otherwise not available), and cell physical parameters. At operation 510, the communication network monitoring device trains a machine learning (ML) model at least based on the radio predictors, the UE location history, and the geolocation of the first UE and the cell physical parameters. In some embodiments, communication network monitoring device trains the ML model at least based on the radio predictors, the UE location history, and the geolocation of the second UE.

At operation 515, the communication network monitoring device executes the ML model to generate a machine learning timing advance (MLTA) of the first UE and the second UE. At operation 520, the communication network monitoring device trains the machine learning (ML) model using the MLTA of the first UE. At operation 525, the communication network monitoring device executes the ML model to determine the azimuth of the second UE. At operation 530, the communication network monitoring device provides a geolocation of the second UE using the azimuth of the second UE and the MLTA of the second UE.

Figure 6:
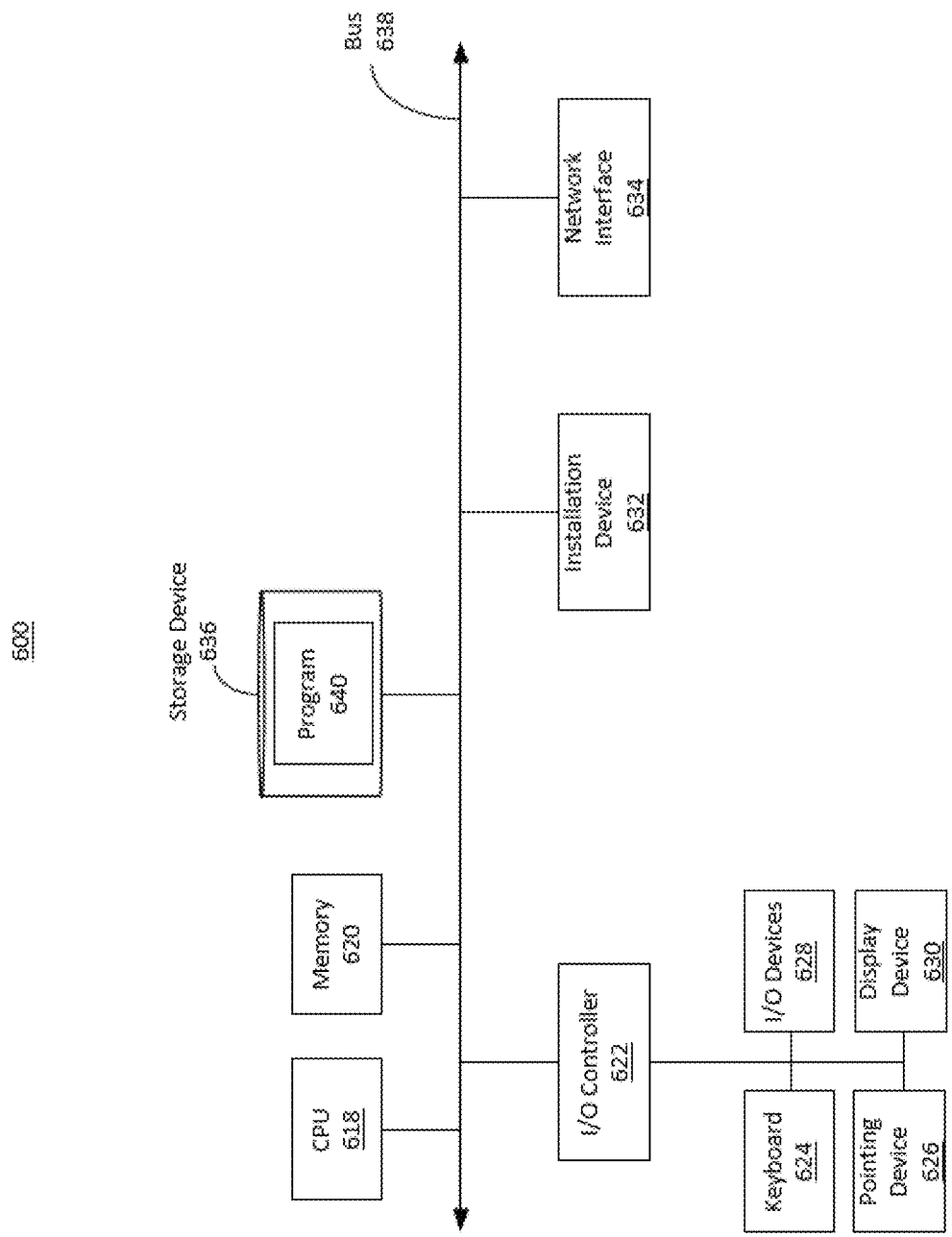
FIG. 6 is a block diagram depicting an implementation of a computing device that can be used in connection with the system depicted in FIG. 1, and the methods depicted in FIGS. 2, 4, and 5.

FIG. 6 depicts block diagrams of a computing device 600 useful for practicing an embodiment of the communication network monitoring device 50. As shown in FIG. 6, each computing device 600 can include a central processing unit 618, and a main memory unit 620. As shown in FIG. 6, a computing device 600 can include one or more of a storage device 636, an installation device 632, a network interface 634, an I/O controller 622, a display device 630, a keyboard 624, or a pointing device 626, e.g. a mouse. The storage device 636 can include, without limitation, a program, such as an operating system, software, or software associated with the system 10 or the network monitoring device 50.

The central processing unit 618 is any logic circuitry that responds to and processes instructions fetched from the main memory unit 620. The central processing unit 618 can be provided by a microprocessor unit. The computing device 600 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6, the processor 618 can communicate with memory 620 via a system bus 638.

A wide variety of I/O devices 628 can be present in the computing device 600. Input devices 628 can include keyboards, mice, trackpads, trackballs, touchpads, touch mice, multi-touch touchpads and touch mice, microphones, multi-array microphones, drawing tablets, cameras, or other sensors. Output devices 628 can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices can have larger surfaces, such as on a table-top or on a wall and can also interact with other electronic devices. Some I/O devices 628, display devices 630, or group of devices can be augmented reality devices. The I/O devices can be controlled by an I/O controller 622 as shown in FIG. 6. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 600. In embodiments, the computing device 600 can provide USB connections (not shown) to receive handheld USB storage devices. In embodiments, an I/O device 628 can be a bridge between the system bus 638 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 600. For example, the computing device 600 can include any type and/or form of video adapter, video card, driver, and/or library to interface, communicate, connect or otherwise use the display devices 630. In embodiments, a video adapter can include multiple connectors to interface to multiple display devices 630.

The computing device 600 can include a storage device 636 (e.g., one or more hard disk drives or redundant arrays of independent disks) for storing an operating system or other related software, and for storing application software programs such as any program 640 related to the systems, methods, components, modules, elements, or functions depicted in FIGS. 1-5. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 600 via a bus 638. Storage device 636 can be external and connect to the computing device 600 via an I/O device 628 that provides an external bus. Storage device 636 can connect to the computing device 600 via the network interface 634 over a network. Some client devices may not require a non-volatile storage device 636 and can be thin clients or zero client systems. Some storage devices 636 can be used as an installation device 632 and can be suitable for installing software and programs.

The computing device 600 can include a network interface 634 to interface to a network such as a network of the mobile communication system 10 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac/ax, CDMA, GSM, UMTS, LTE, 5G, WiMax and direct asynchronous connections). The computing device 600 can communicate with other computing devices 600 via any type and/or form of gateway or tunneling protocol e.g., Secure Socket Layer (SSL), Transport Layer Security (TLS), or QUIC protocol. The network interface 634 can include a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 can operate under the control of an operating system, which controls scheduling of tasks and access to system resources. The computing device 600 can be running any operating system configured for any type of computing device, including, for example, a desktop operating system, a mobile device operating system, a tablet operating system, or a smartphone operating system.

The computing device 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 600 has sufficient processor power and memory capacity to perform the operations described herein. In some embodiments, the computing device 600 can have different processors, operating systems, and input devices consistent with the device.

In embodiments, the status of one or more machines (e.g., one or more of the UE 20 or the base station 35) in the network can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems, and methods described herein can be implemented by the computing device 600 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 600 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the system 10 or the network monitoring device 50) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A communication network monitoring device comprising a processor and a memory, wherein the memory comprises instructions that, when executed by the processor, cause the device to:

receive, from a base station (BS), radio predictors of a first user equipment (UE) for which a minimization of drive test (MDT) mode is activated, a UE location history of the first UE, a geolocation of the first UE, radio predictors of a second UE for which the MDT mode is not activated, a UE location history of the second UE, and cell physical parameters, wherein the radio predictors of the first UE comprise a timing advance (TA) of the first UE and a channel quality indication (CQI) of the first UE, and wherein the radio predictors of the second UE comprise a TA of the second UE and a CQI of the second UE;

train a machine learning (ML) model to determine an azimuth of the second UE at least based on the radio predictors of the first UE, the UE location history of the first UE, the geolocation of the first UE, and the cell physical parameters;

execute the ML model to determine the azimuth of the second UE; and provide, to a downstream application, a geolocation of the second UE at least based on the azimuth of the second UE and the TA of the second UE.

2. The device of claim 1, wherein the ML model that is executed to determine the azimuth of the second UE is trained using the TA of the first UE.

3. The device of claim 1, the instructions, when executed by the processor, further cause the device to:

train the ML model using the TA of the first UE before training the ML model to determine the azimuth of the second UE; and execute the ML model that was trained using the TA of the first UE to generate a machine learning timing advance (MLTA) of the first UE;

wherein training the ML model to determine the azimuth of the second UE comprises training the ML model using the MLTA of the first UE, wherein executing the ML model to determine the azimuth of the second UE comprises executing the ML model that was trained using the MLTA of the first UE to determine the azimuth of the second UE.

4. The device of claim 3, the instructions, when executed by the processor, further cause the device to:

execute the ML model that was trained using the TA of the first UE to generate a machine learning timing advance (MLTA) of the second UE;

provide, to a downstream application, a geolocation of the second UE at least based on the MLTA of the second UE.

5. The device of claim 1, the instructions, when executed by the processor, further cause the device to:

train a second ML model using the TA of the first UE before training the ML model to determine the azimuth of the second UE, wherein the ML model uses a first algorithm and the second ML model uses a second algorithm different from the first algorithm; and execute the second ML model that was trained using the TA of the first UE to generate a machine learning timing advance (MLTA) of the first UE;

wherein training the ML model to determine the azimuth of the second UE comprises training the ML model using the MLTA of the first UE.

6. The device of claim 1, the instructions, when executed by the processor, further cause the device to:

determine an estimated distance between the BS and the second UE at least based on the TA of the second UE, wherein providing, to the downstream application, the geolocation of the second UE at least based on the azimuth of the second UE and the TA of the second UE comprises providing, to the downstream application, the geolocation of the second UE at least based on the azimuth of the second UE and the estimated distance between the BS and the second UE.

7. The device of claim 1, wherein providing, to the downstream application, the geolocation of the second UE at least based on the azimuth of the second UE and the TA of the second UE comprises:

converting the azimuth and an estimated distance between the BS and the second UE at least based on the TA of the second UE into a latitude coordinate and a longitude coordinate; and providing the latitude coordinate and the longitude coordinate to the downstream application.

8. The method of claim 1, wherein the ML model uses a plurality of decision trees, wherein the plurality of decision trees are used in accordance with the Random Forest algorithm.

9. The device of claim 1, wherein the radio predictors of the first UE comprise a measurement report of the first UE, and wherein the radio predictors of the second UE comprise a measurement report of the second UE.

10. The device of claim 9, wherein the measurement report of the first UE comprises a serving cell Reference Signal Received Power (RSRP) of the first UE, a serving cell Reference Signal Received Quality (RSRQ) of the first UE, a neighbor cell RSRP of the first UE, a neighbor cell RSRQ of the first UE, and MDT data, and wherein the measurement report of the second UE comprises a serving cell RSRP of the first UE, a serving cell RSRQ of the second UE, a neighbor cell RSRP of the second UE, and a neighbor cell RSRQ of the second UE.

11. The device of claim 10, wherein the measurement report of the first UE comprises a serving cell synchronization signal/physical broadcast channel (PBCH) block (SSB) index of the first UE, and a neighbor cell SSB index of the first UE, and wherein the measurement report of the second UE comprises a serving cell SSB index of the second UE, and a neighbor cell SSB index of the second UE.

12. The device of claim 1, wherein the cell physical parameters comprise an antenna latitude location, an antenna longitude location, an antenna horizontal beam width, an antenna vertical beam width, an antenna boresight direction, an antenna gain and an antenna signal transmit power.

13. A method to determine a geolocation, the method comprising:

receiving, by a processor, from a base station (BS), radio predictors of a first user equipment (UE) for which a minimization of drive test (MDT) mode is activated, a UE location history of the first UE, a geolocation of the first UE, radio predictors of a second UE for which the MDT mode is not activated, a UE location history of the second UE, and cell physical parameters, wherein the radio predictors of the first UE comprise a timing advance (TA) of the first UE and a channel quality indication (CQI) of the first UE, and wherein the radio predictors of the second UE comprise a TA of the second UE and a CQI of the second UE;

training, by the processor, a machine learning (ML) model to determine an azimuth of the second UE at least based on the radio predictors of the first UE, the UE location history of the first UE, the geolocation of the first UE, and the cell physical parameters;

executing, by the processor, the ML model to determine the azimuth of the second UE; and providing, by the processor, to a downstream application, a geolocation of the second UE at least based on the azimuth of the second UE and the TA of the second UE.

14. The method of claim 13, wherein the ML model that is executed to determine the azimuth of the second UE is trained using the TA of the first UE.

15. The method of claim 13, further comprising:
training the ML model using the TA of the first UE before training the ML model to determine the azimuth of the second UE; and
executing the ML model that was trained using the TA of the first UE to generate a machine learning timing advance (MLTA) of the first UE;
wherein training the ML model to determine the azimuth of the second UE comprises training the ML model using the MLTA of the first UE,
wherein executing the ML model to determine the azimuth of the second UE comprises executing the ML model that was trained using the MLTA of the first UE to determine the azimuth of the second UE.

16. The method of claim 13, wherein providing, to the downstream application, the geolocation of the second UE at least based on the azimuth of the second UE and the TA of the second UE comprises:
converting the azimuth and an estimated distance between the BS and the second UE at least based on the TA of the second UE into a latitude coordinate and a longitude coordinate; and
providing the latitude coordinate and the longitude coordinate to the downstream application.

17. The method of claim 13, wherein the radio predictors of the first UE comprise a measurement report of the first UE, and wherein the radio predictors of the second UE comprise a measurement report of the second UE.

18. The method of claim 17, wherein the measurement report of the first UE comprises a serving cell Reference Signal Received Power (RSRP) of the first UE, a serving cell Reference Signal Received Quality (RSRQ) of the first UE, a neighbor cell RSRP of the first UE, a neighbor cell RSRQ of the first UE, and MDT data, and wherein the measurement report of the second UE comprises a serving cell RSRP of the first UE, a serving cell RSRQ of the second UE, a neighbor cell RSRP of the second UE, and a neighbor cell RSRQ of the second UE.

19. A non-transitory computer-readable medium comprising instructions stored thereon that, when executed by a processor, cause the processor to:
receive, from a base station (BS), radio predictors of a first user equipment (UE) for which a minimization of drive test (MDT) mode is activated, a UE location history of the first UE, a geolocation of the first UE, radio predictors of a second UE for which the MDT mode is not activated, a UE location history of the second UE, and cell physical parameters, wherein the radio predictors of the first UE comprise a timing advance (TA) of the first UE and a channel quality indication (CQI) of the first UE, and wherein the radio predictors of the second UE comprise a TA of the second UE and a CQI of the second UE;
train a machine learning (ML) model to determine an azimuth of the second UE at least based on the radio predictors of the first UE, the UE location history of the first UE, the geolocation of the first UE, and the cell physical parameters;
execute the ML model to determine the azimuth of the second UE; and
provide, to a downstream application, a geolocation of the second UE at least based on the azimuth of the second UE and the TA of the second UE.

20. The medium of claim 19, wherein the ML model that is executed to determine the azimuth of the second UE is trained using the TA of the first UE.

21. The medium of claim 19, the instructions, when executed by the processor, further cause the processor to:
train the ML model using the TA of the first UE before training the ML model to determine the azimuth of the second UE; and
execute the ML model that was trained using the TA of the first UE to generate a machine learning timing advance (MLTA) of the first UE;
wherein training the ML model to determine the azimuth of the second UE comprises training the ML model using the MLTA of the first UE,
wherein executing the ML model to determine the azimuth of the second UE comprises executing the ML model that was trained using the MLTA of the first UE to determine the azimuth of the second UE.

22. The medium of claim 19, wherein providing, to the downstream application, the geolocation of the second UE at least based on the azimuth of the second UE and the TA of the second UE comprises:
converting the azimuth and an estimated distance between the BS and the second UE at least based on the TA of the second UE into a latitude coordinate and a longitude coordinate; and
providing the latitude coordinate and the longitude coordinate to the downstream application.

23. The medium of claim 19, wherein the radio predictors of the first UE comprise a measurement report of the first UE, and wherein the radio predictors of the second UE comprise a measurement report of the second UE.

24. The medium of claim 23, wherein the measurement report of the first UE comprises a serving cell Reference Signal Received Power (RSRP) of the first UE, a serving cell Reference Signal Received Quality (RSRQ) of the first UE, a neighbor cell RSRP of the first UE, a neighbor cell RSRQ of the first UE, and MDT data, and wherein the measurement report of the second UE comprises a serving cell RSRP of the first UE, a serving cell RSRQ of the second UE, a neighbor cell RSRP of the second UE, and a neighbor cell RSRQ of the second UE.

* * * * *